United States Patent

Yang

[11] Patent Number: 5,950,784
[45] Date of Patent: Sep. 14, 1999

[54] HUB STRUCTURAL IMPROVEMENT

[76] Inventor: Shu-Chiung C. Yang, No. 9-1, Lane 20, Jung-Hua St., Taichung, Taiwan

[21] Appl. No.: 08/922,591

[22] Filed: Sep. 3, 1997

[51] Int. Cl.$^6$ .................................................... F16D 41/30
[52] U.S. Cl. ........................................ 192/64; 301/110.5
[58] Field of Search ........................... 192/217.2, 217.5, 192/64; 301/110.5

[56] References Cited

U.S. PATENT DOCUMENTS

| | | | |
|---|---|---|---|
| 4,702,486 | 10/1987 | Tsuchie | 192/64 X |
| 5,433,306 | 7/1995 | Yang | 192/64 |
| 5,460,254 | 10/1995 | Huang | 192/64 |
| 5,676,227 | 10/1997 | Hugi | 192/64 |

Primary Examiner—Rodney H. Bonck
Attorney, Agent, or Firm—Rosenberg, Klein & Bilker

[57] ABSTRACT

The subject invention relates to a type of hub structural improvement, comprising mainly the clutch mechanism that is composed of a clutch and the ratchet teeth of the bearing housing inside the hub; so that the whole unit can independently perform a single-direction brake function; without additional components as in conventional structures; with its high compatibility of components, only the chain wheel support has to be replaced in case of additional function of multi-step speed changes; without replacing many components as in conventional structures, which would result in higher assembling costs; under the trend of ever-changing bicycle specifications, it will reduce the change of measurements of relevant components, thus reducing the production costs.

4 Claims, 6 Drawing Sheets

HUB STRUCTURAL IMPROVEMENT

BACKGROUND OF THE INVENTION

The subject invention relates to a type of hub structural improvement, particularly to one that can independently perform its brake function, perform conveniently, and enable more convenient assembling.

DESCRIPTION OF PRIOR ART

Conventionally, a prior art of hub structure involves a spindle inside a hub, with two sides accommodating the bearing, so the hub may freely rotate in two directions; to enable single-direction brake function, it needs additional fitting of other clutch components; in other words, the outside of the spindle will have to be burdened with a set of clutch components and ratchet components, with additional chain wheel on the extension of its outside cylinder; in other words, said clutch component, ratchet component and extended cylinder chain wheel will compose an independent unit, thus the result is many additional components to be fitted onto the outside of the hub. However, under the trend of ever-changing bicycle specifications, if multi-step speed change function is desired, there is the need to install many additional chain wheels, and that would require the replacement of all components such as the clutch, the ratchet, the extension cylinder and the chain wheels, etc., which result in inadequate compatibility among the components and the need to manufacture many more components of various measurements and specifications; it would not only increase the assembling costs, but would also significantly increase the production costs.

SUMMARY OF THE INVENTION

The primary purpose of the subject invention is to provide a type of hub structural improvement that is not only applicable to a single wheel shaft, but also to a rear wheel shaft; serving as a hub for double purposes of a single speed or multi-step speed change; said hub itself can independently perform the brake function; said hub has a high compatibility, so that when multi-step speed change function is required, only a few components have to be replaced, in order to lower the assembling costs; moreover, its simplified structure will enable simple assembling and maintenance purposes.

To enable better understanding of the characteristics and technical contents of the subject invention, please refer to the following detailed description with drawings; however, the attached drawings are only for the purposes of reference and description, which shall not be based to restrict or limit the subject invention. The drawings concerning said example of embodiment are as follows:

BRIEF DESCRIPTION OF NUMERALS

| Brief Description of Numerals | | | |
|---|---|---|---|
| 10 | hub | 11 | first rim |
| 12 | second rim | 13 | spindle |
| 14 | bearing housing | 15 | bearing |
| 16 | bearing housing | 17 | bearing |
| 18 | clutch | 19 | cone |
| 20 | ratchet teeth | 21 | check pawl |
| 22 | water-resistant cover | 23 | screw |
| 24 | fixing piece | 25 | small cone |
| 26 | bearing | 27 | small cone |
| 28 | bearing | 29 | chain wheel support |
| 30 | external thread | 31 | internal thread |
| 32 | small cone | 33 | bearing |
| 34 | chain wheel | 35 | fixing piece |

DETAILED DESCRIPTION OF PREFERRED EMBODIMENT

Figure 1:
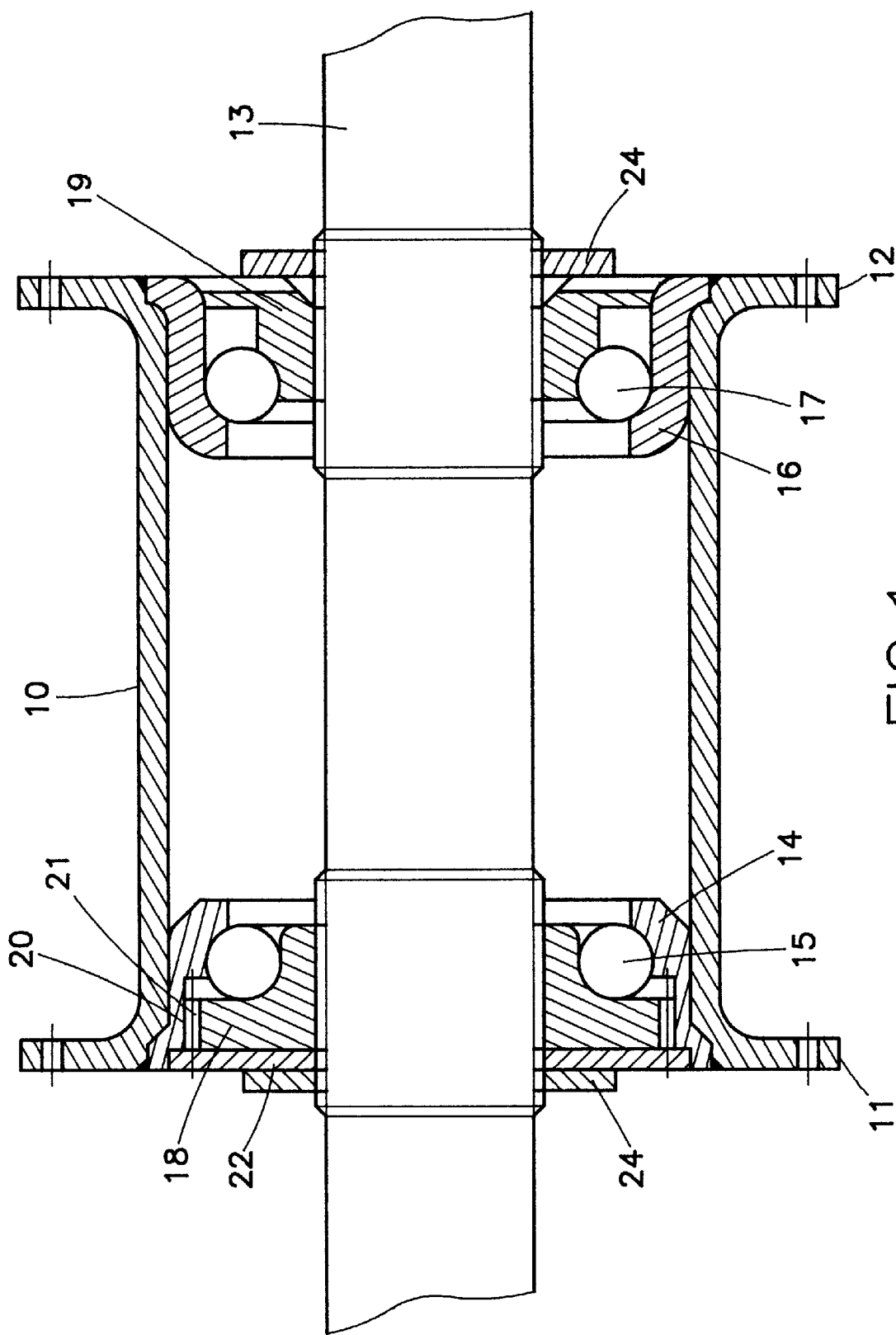
FIG. 1 is a plane section view of the subject invention when applied to a single wheel shaft.
Figure 2:
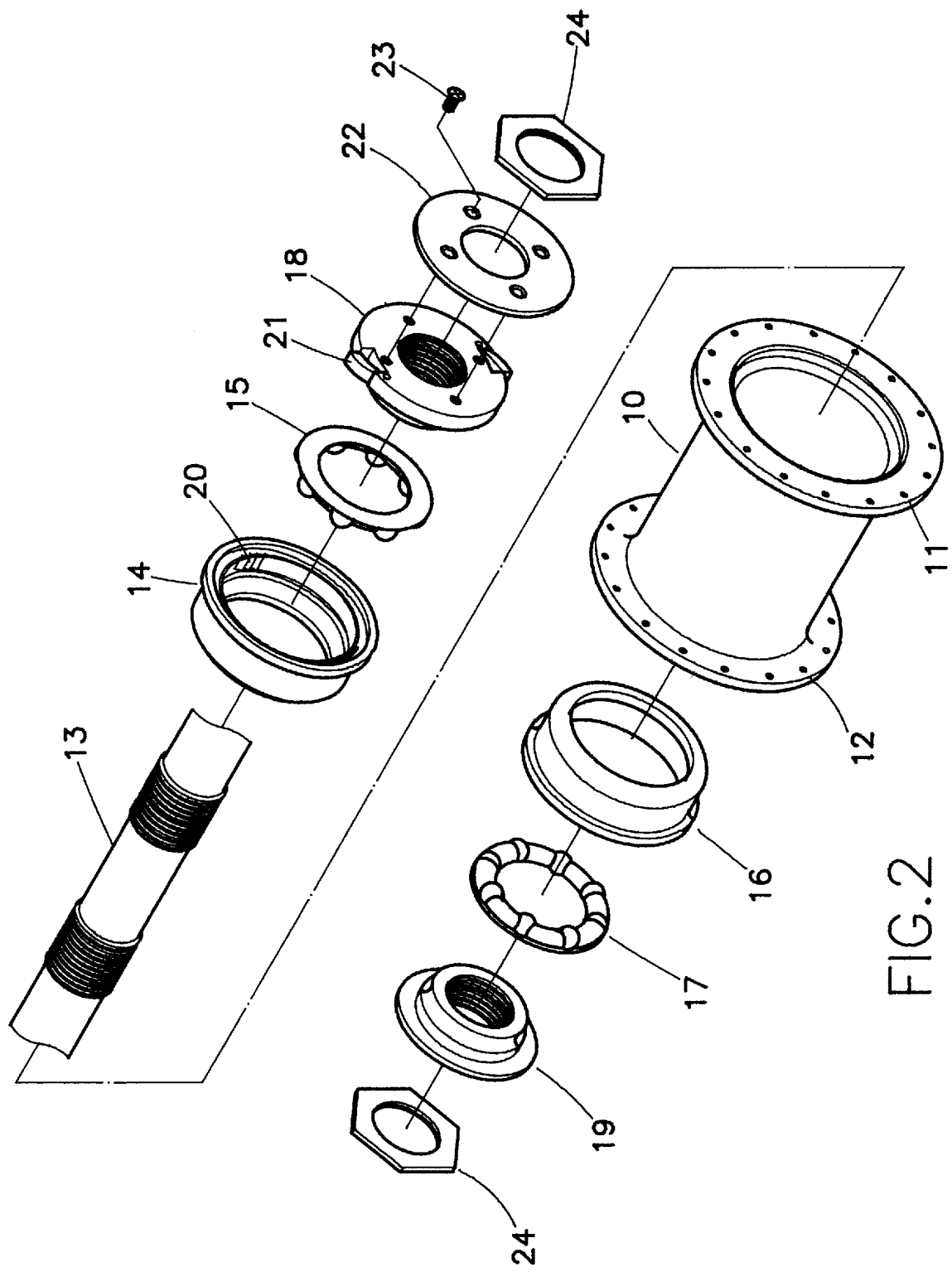
FIG. 2 is an exploded view of the subject invention when applied to a single wheel shaft.

Please refer to FIGS. 1 and 2 which are respectively a plane section view and an exploded view of the subject invention when applied to a single wheel shaft; said hub mechanism is especially applicable to a single wheel shaft, comprising a hub 10 which involves a first rim 11 and a second rim 12; a free rotating spindle 13 that is located inside the hub 10; a bearing housing 14 and a bearing 15 that are located inside the first rim 11 of the hub 10; another bearing housing 16 and a bearing 17 that are located inside the second rim 12 of the hub 10; a clutch 18 and a cone 19 that are respectively located at the spindle and between the two bearings 15 and 17; so that the spindle 13 may rotate freely inside the hub 10; said clutch 18 and cone 19 are joined with screws to the spindle 13 and are rotating with the spindle 13; inside the bearing housing 14 are a number of ratchet teeth 20 distributed in a ring shape; and on the circumference of the clutch are two (one or two) opposite check pawls 21 that can be toothed with the ratchet teeth 20 on the bearing housing 14; so that when the spindle 13 turns in one direction, it serves as a brake device such as on a bicycle; on the outside of the clutch 18 is a water-resistant cover 22; said water-resistant cover 22 is fastened to the clutch 18 with a number of screws 23, to enable protection against water; the two fixing pieces 24 are fixed with screws onto the spindle 13, to fix the components in position.

Figure 3:
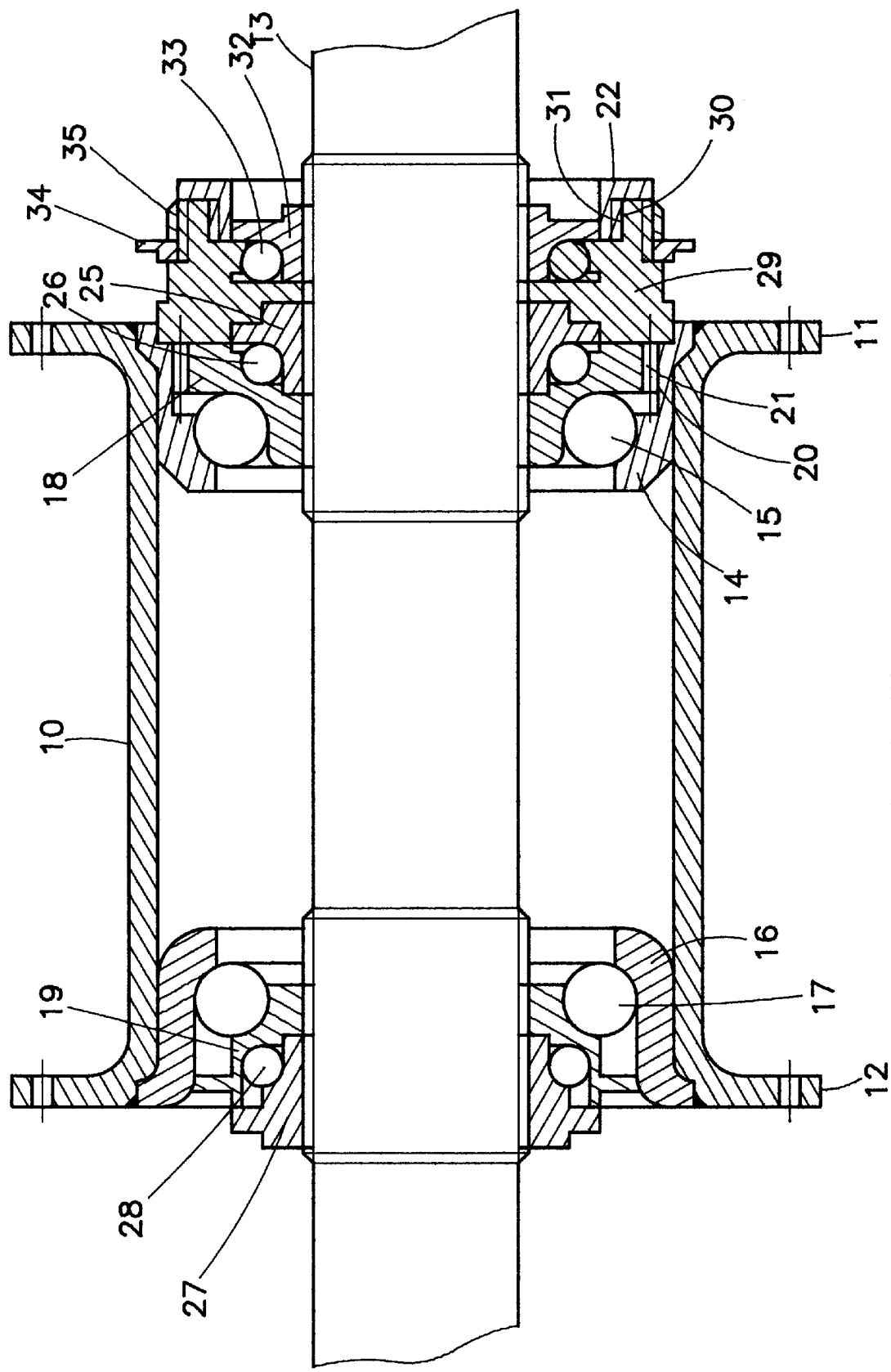
FIG. 3 is a plane section view of the subject invention when applied to a rear wheel shaft.
Figure 4:
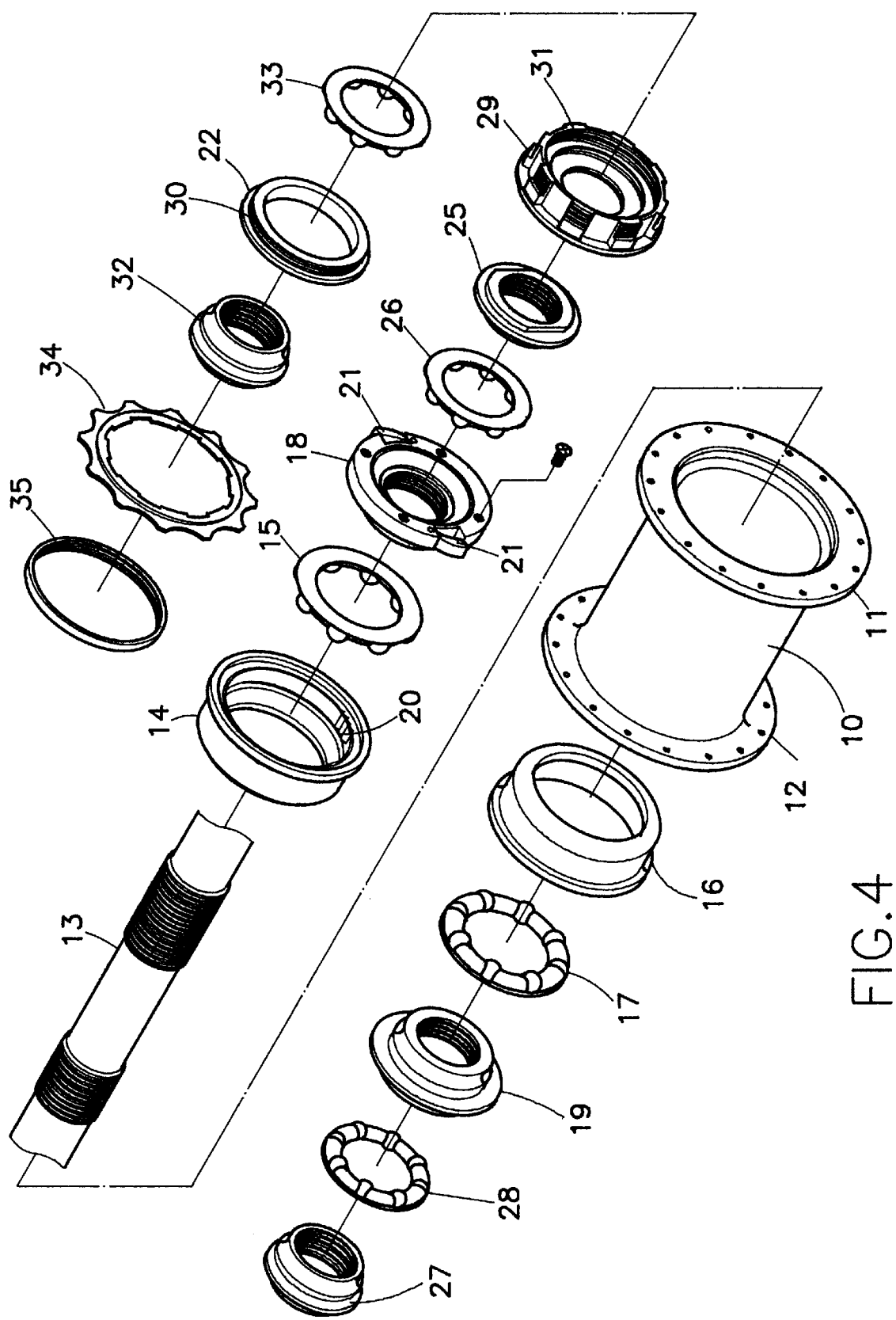
FIG. 4 is an exploded view of the subject invention when applied to a rear wheel shaft.

Referring to FIGS. 3 and 4 which are respectively a plane section view and an exploded view of the subject invention when applied to a rear wheel shaft, comprising a hub 10 which includes a first rim 11 and a second rim 12; a spindle 13 that can freely rotate inside the hub 10; a bearing housing 14 and a bearing 15 that are fitted inside the first rim 11 of the hub 10; another bearing housing 16 and a bearing 17 that are fitted inside the second rim 12 of the hub 10; a clutch 18 and a cone 19 that are respectively located in the spindle 13 and between the two bearings 15 and 17; said clutch 18 involves a small cone 25 and a bearing 26 that are located on the spindle 13; said cone 19 involves a small cone 27 and a bearing 28 that are located on the spindle 13; so that the spindle 13 may rotate freely inside the hub 10; inside the bearing housing 14 in the first rim 11 are a number of ratchet teeth 20; on the circumference of the clutch 18 are corresponding two check pawls 21 that can be teethed with the ratchet teeth 20 on the bearing housing 14; so that when the spindle 13 turns in one direction, it serves as a brake device as on a bicycle; on the outside of the clutch 18 is welded with a chain wheel support 29; a water-resistant cover 22 is appropriately thickened to include an external thread 30; said water-resistant cover 22 can be screwed together by the external thread 30 to the internal thread 31 of the chain wheel support 29, said chain wheel support 29 is installed on the spindle 13 with a small cone 32 and a bearing 33; a chain wheel 34 is fastened with a fixing piece 35 to the chain wheel support 29; so that when the chain wheel 34 turns in one direction, the chainwheel support 29 will drive the clutch 18 to turn; on the circumference of the clutch 18 are corresponding two check pawls 21 that can be toothed with the ratchet teeth 20 of the bearing housing 14, serving as a brake device on a bicycle.

Figure 5:
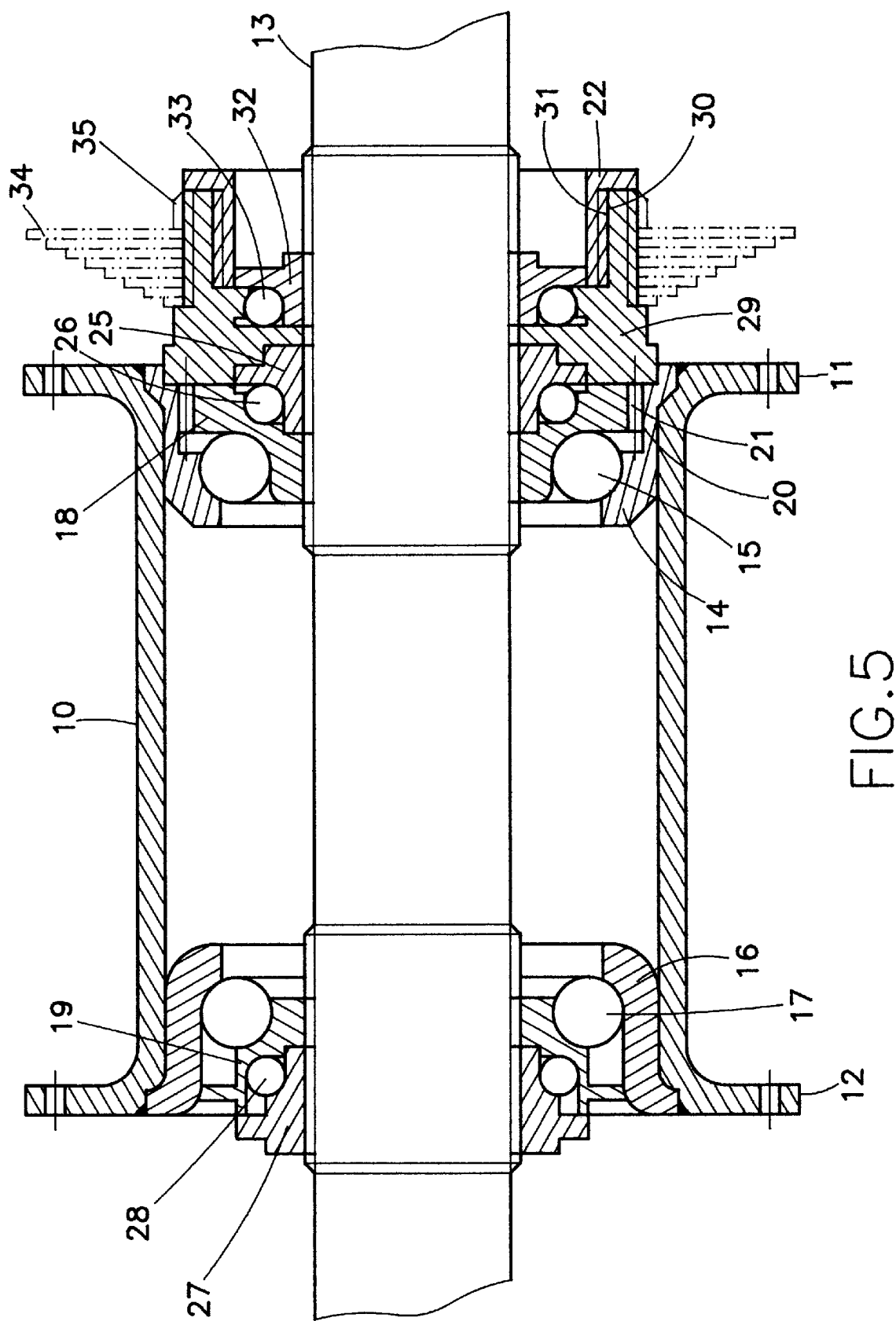
FIG. 5 is a plane section view of another embodiment the subject invention when applied to a single wheel shaft.
Figure 6:
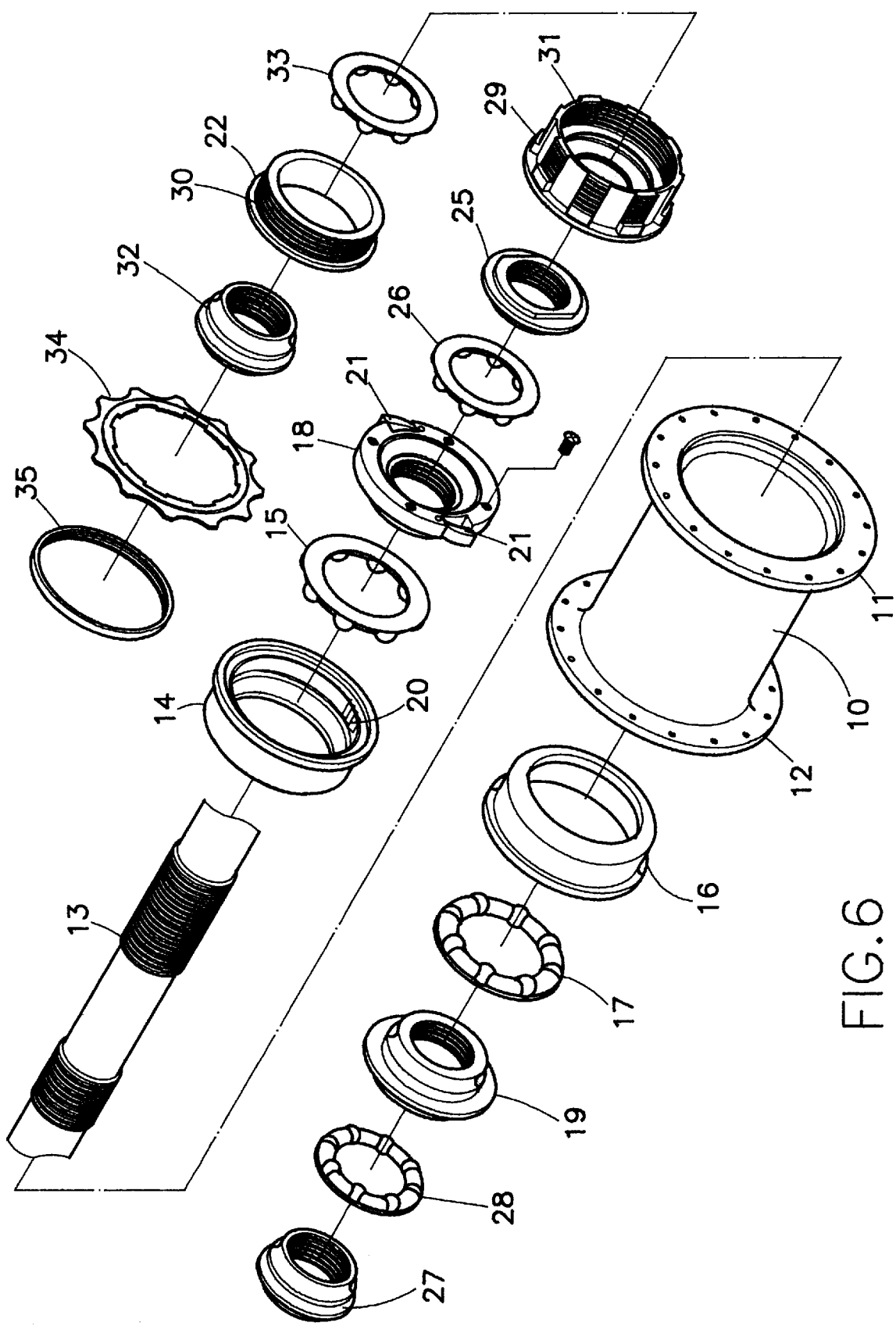
FIG. 6 is an exploded view of another embodiment of the subject invention when applied to a single wheel shaft.

Please refer to FIGS. 5 and 6 which are respectively a plane section view and an exploded view of another embodiment of the subject invention when applied to a rear wheel shaft; the length of said chain wheel support 29 can be appropriately lengthened, so that said chain wheel support 29 can be used to support two or more chain wheels 34, thus forming multi-step speed-change hub mechanism.

The subject invention involves the delicate design inside the hub of a clutch mechanism comprising a clutch 18 and the ratchet teeth 20 on the bearing housing 14, so that the whole unit can independently perform its single-direction brake function, without the addition of other components as in conventional structures; also the subject invention has a high compatibility of the components; when it is used for multi-step speed changes, all we have to do is to replace the chain wheel support 29; without the need of replacing many components, as in conventional structures which would increase the assembling costs; under the trend of ever-changing bicycle specifications, the subject invention will require less amendment of relevant component measurements, thus reducing the production costs.

Summing up, the subject invention of innovated hub mechanism that can be applied to a single wheel shaft and a rear wheel shaft, and simultaneously serving as a hub mechanism for multi-step speed change functions, is indeed an unprecedented creation with its inventive step and originality that will fully satisfy the qualifications for a patent right; hence this application is filed in accordance with the Patent Law to protect the subject inventor's rights and interests. Your favorable consideration should be appreciated.

It is hereby declared that the above description, covering the preferred embodiment, should not be based to limit or restrict the subject claim, and that all equivalent structural and/or configurational variations and/or modifications deriving from the subject description with drawings and contents therein, should reasonably be included in the intent of the subject invention and the subject claim.

I claim:

1. A hub structural improvement, comprising:

a hub including a first rim and a second rim;

a spindle rotating freely and installed inside said hub;

a first bearing housing engaging an internal surface of said second rim;

a first cone extending into said first bearing housing and threadedly engaging said spindle;

a first bearing disposed between said first bearing housing and said first cone;

a second cone extending into said first cone and provided on an opposing side of said first bearing, said second cone threadedly engaging said spindle;

a second bearing disposed between said first and second cones;

a second bearing housing engaging an internal surface of said first rim around said spindle and having a number of ratchet teeth;

a clutch disposed inside said second bearing housing around said spindle, said clutch threadedly engaging said spindle and having at least one check pawl to engage said ratchet teeth;

a third bearing located between said second bearing housing and said clutch;

a third cone disposed on a side of said clutch opposite said third bearing, said third cone threadedly engaging said spindle;

a fourth bearing located between said third cone and said clutch;

a chain wheel support mounted on said spindle and fixed to said clutch for simultaneous rotation therewith; and a chain wheel mounted on said chain wheel support.

2. The hub structural improvement as claimed in claim 1, further comprising a fourth cone disposed on a side of said chain wheel support opposite said clutch and threadedly engaging said spindle, and a fifth bearing disposed between said chain wheel support and said fourth cone, said chain wheel support surrounding said third cone and said fourth cone and projecting radially inward to threadedly engage said spindle between said third cone and fourth cone, wherein said clutch, said third cone, said chain wheel support, and said fourth cone abut against one another and are tightened in sequence on the spindle.

3. A hub structural improvement, comprising:

a hub including a first rim and a second rim;

a spindle rotating freely and installed inside said hub;

a first bearing housing engaging an internal surface of said second rim;

a first cone disposed inside said first bearing housing and threadedly engaging said spindle;

a first bearing disposed between said first bearing housing and said first cone;

a second cone extending into said first cone and provided on an opposing side of said first bearing, said second cone threadedly engaging said spindle;

a second bearing disposed between said first and second cones;

a second bearing housing engaging an internal surface of said first rim around said spindle and having a number of ratchet teeth;

a clutch disposed inside said second bearing housing around said spindle and having at least one check pawl to engage said ratchet teeth;

a third bearing located between said second bearing housing and said clutch;

a chain wheel support fixed to said clutch for simultaneous rotation therewith and provided oppositely of said third bearing, said chain wheel support threadedly engaging said spindle;

a third cone disposed on one side of said chain wheel support and threadedly engaging said spindle;

a fourth bearing located between said third cone and said chain wheel support; and a chain wheel mounted on said chain wheel support.

4. A hub structural improvement, comprising:

a hub including a first rim and a second rim;

a spindle rotating freely and installed inside said hub;

two bearing housings, each of which engages an internal surface of one of said first and second rims;

two cones each of which is disposed inside a respective one of said bearing housing and threadedly engaging said spindle;

two bearings each of which is disposed between a respective one of said bearing housings and a corresponding one of said cones;

two additional cones, each of which is disposed adjacent one side of a corresponding one of said cones on a side opposite a corresponding one of said bearings and threadedly engaging said spindle; and two additional bearings, each of which is disposed between a respective one of said cones and a corresponding one of said additional cones.

\* \* \* \* \*